June 8, 1926.

C. F. P. SPIELMAN 1,588,061

CHEESE TREATING MACHINE

Filed Dec. 22, 1925

Inventor
Carl F. P. Spielman
By
Attorneys

Patented June 8, 1926.

1,588,061

UNITED STATES PATENT OFFICE.

CARL F. P. SPIELMAN, OF HERSEY, WISCONSIN.

CHEESE-TREATING MACHINE.

Application filed December 22, 1925. Serial No. 76,976.

This invention relates to a cheese treating machine.

Machines for treating cheese have heretofore been constructed but they have several defects among which may be mentioned the fact that it is extremely difficult to conserve the steam supplied the cheese and to secure uniform heating of the products at all stages of the treating, and further the very serious defect that it is a practical impossibility to keep the machines in a sanitary condition as they have numerous complicated and difficultly accessible parts which, from a practical point of view, precludes absolute cleanliness.

This invention is designed to overcome the above noted defects, and objects of such invention are to provide a cheese treating machine which may be most easily kept in a sanitary condition in a simple and effective manner, which is so constructed that the parts may be bodily withdrawn in a simple and easy manner, and in which the most effective action of the steam or other heating fluid is secured with a minimum loss thereof.

Further objects are to provide a machine which will continuously comminute the cheese and continuously agitate it while it is subjected to the direct action of the steam, which will insure the most intimate mixing of all particles of the mass as it passes continuously through the machine, and which will gradually raise the temperature of the cheese until it arrives at the desired state of plasticity or fluidity.

Further objects are to provide a machine which is of extreme simplicity, which requires a small amount of power to operate it, and which lends itself readily to practical manufacturing processes.

An embodiment of the invention is shown in the accompanying drawings, in which:—

Figure 1:
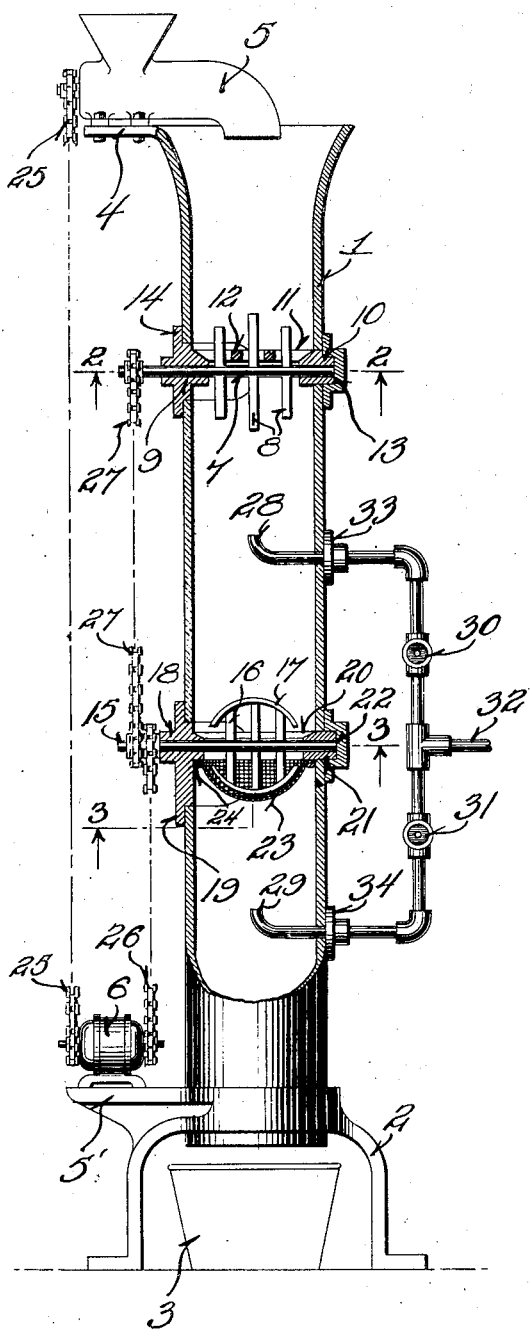
Figure 1 is a vertical sectional view through the apparatus.

The machine comprises a main mixing or treating tube 1 arranged vertically and carried by suitable supports 2 to allow room for the receiving containers 3 which may be slipped below the lowest end of this treating tube. The upper end of the treating tube is slightly flared or bell-shaped and is provided with a flattened portion 4 to which the comminuting or grinding machine 5 is removably bolted. The base 2 is provided with a shelf or flange 5 upon which the driving motor 6 is secured.

At a point spaced downwardly from the upper end of the treating tube 1, an agitator or mixer is provided and consists of a horizontal shaft 7 which carries a plurality of transverse beating or mixing arms 8. Preferably all of these arms are arranged in the same plane and are of different lengths to conform to the shape of the treating tube 1.

Figure 2:
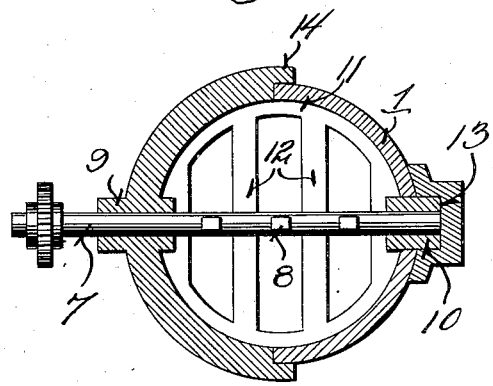
Figure 2 is a sectional view on the line 2—2 of Figure 1 to an enlarged scale.

The shaft 2 is carried in a front bearing 9 and a rear bearing 10 joined integrally by means of the grating 11, such grating being provided with slats or transverse stationary arms 12 between which the rotary arms 8 operate, as most clearly shown in Figure 2.

The inner bearing 10 is so formed that it removably fits bodily into an aperture 13 carried by the main tube 1.

The front bearing 9 is provided with flanges 14 which may be bolted or otherwise detachably secured to the face of the tube 1.

Thus, when it is desired to clean the device, it is a simple matter to turn the arms 8 into a horizontal position and slide this mixing or agitating unit bodily from the tube 1.

At a point spaced below the mixing unit described above, a second mixing unit is provided and this consists of a horizontal shaft 15 provided with a plurality of arms or beating members 16 which are of different lengths and join segments 17 of an annular ring, as shown most clearly in Figure 1. In a similar manner this mixing unit is provided with a front bearing 18 equipped with a flange 19 detachably secured to the face of the tube 1. This flange integrally carries a ring 20 (see Figure 3) which is provided with a bearing portion 21 seated in a socket 22 carried by the tube 1.

Figure 3:
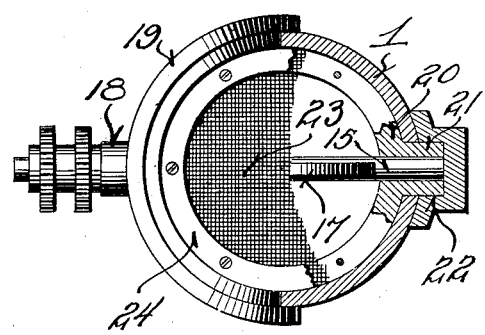
Figure 3 is a corresponding sectional view on the line 3—3 of Figure 1.

Further, it is to be noted that this mixing unit carries a spherically shaped screen or sieve 23 which is secured to the ring 20 in any suitable manner, as by means of the clamping ring 24 shown in detail in Figure 3.

It is to be noted that the arcuate segments 17 are brought into close proximity to the screen 23 as the mixing unit is rotated and consequently insures the passage of softened cheese through this screen.

Each of the devices, namely, the two mixing units and the comminuting device or grinder is driven from the motor 6 in a suitable manner. For instance, sprocket wheels are provided on the grinder and at one end of the motor shaft, and are joined by means of the chain 25 (see Figure 1.) Further, a sprocket wheel carried by the shaft 15 and joined by the chain 26 to a sprocket wheel is carried at the other end of the motor shaft. A second sprocket wheel is provided upon the shaft 15 and is connected by means of a chain 27 with a sprocket wheel carried by the shaft 7.

It will be seen that an extremely simple drive has been provided wholly external with reference to the mixing tube 1 and in an easily accessible position.

The means for supplying heat to the device may comprise an upper steam jet or pipe 28 positioned below the upper mixing unit, and a lower steam jet or pipe 29 positioned below the lower mixing unit. These discharge pipes or jets are controlled by valves 30 and 31 and are supplied by a main steam supply pipe 32. Thus the heat, at individual portions of the tube 1, may be accurately regulated in a simple manner, and the steam is caused to directly operate beneath cheese while it is being agitated.

In operation, the cheese to be treated is fed into the grinder and discharged into the upper end of the tube 1. The upper agitator or mixer intimately mixes these fragments of cheese while they are softened by the blast of steam from the pipe 28 and insures a homogenizing action. The cheese in this condition passes down the tube through the action of gravity and is passed through the screen 23 by the second or lower mixer or agitating device. Further, the lower steam jet or nozzle causes a stream of steam to play upon the screen and to further elevate the temperature of the cheese so that the cheese in a fluid or semi-fluid condition, passes downwardly through the tube and is collected in any appropriate manner as by means of the vessels 3 placed beneath the apparatus and changed from time to time.

It has been found from actual experiments conducted with this apparatus, that this cheese is extremely homogeneous when treated by this machine, and has all of the desirable characteristics needed for repacking or re-treating. Further, the cheese is at no time subjected to dangerous temperature which might injure its flavor or physical characteristics, but is subjected to a controlled amount of heat at successive portions of its travel through the mixing tube 1.

Further, no form of propelling conveyor is needed with this device as it operates through the action of gravity in a simple manner and, therefore, the complicated structures heretofore thought necessary, have been wholly avoided.

Further than this, the cheese is contained in a closed tube 1 out of contact with the air and is consequently less likely to pick up undesirable particles floating in the air. Further than this, the sterilizing action of the steam plays an important part in the keeping qualities of the cheese.

It is to be particularly noted that when it is desired to clean the device after a continuous run of the desired length of time, it is merely necessary to detach the flanges 14 and 19 of the upper and lower mixing units and to bodily slide these devices laterally from the tube 1, the lower unit carrying the screen 23 with it. If desired, the grinder may also be easily detached.

Further, it is to be noted that the steam pipes o and 29 are provided with flanges 33 and 34 which are detachably secured to the tube 1. Consequently the heating pipe may be quickly withdrawn laterally from the tube. This leaves the mixing tube unobstructed from its upper to its lower end and permits a most thorough cleaning thereof.

Further, the individual mixing units may be most easily cleaned while they are removed from the machine as may also the grinder.

It will be seen that a cheese treating machine has been provided which is of the utmost simplicity, and which is so organized that a free and unobstructed cleaning of the device may be secured with the utmost assurance that the parts may be retained in their perfectly sanitary condition.

Although the invention has been described in considerable detail, such description is intended as illustrative rather than limiting as the invention may be variously embodied and as the scope of such invention is to be determined as claimed.

I claim:

1. A cheese treating machine comprising a treating tube open at its upper and lower end, means for feeding comminuted cheese into the upper end of said tube, a mixing device extending across said tube, and a steam jet positioned within said tube and below said mixing device.

2. A cheese treating machine comprising a vertical tube open from one end to the other, a mixing device extending transversely across said tube and removably carried thereby, means for feeding comminuted cheese into the upper end of said tube, and a steam jet removably positioned below said mixing device.

3. A cheese treating machine comprising a vertical mixing tube, means for feeding comminuted cheese into the upper end of said tube, an agitating device adapted to agitate the comminuted cheese, a steam jet positioned below such device, a second agitating device spaced downwardly below said steam jet, a second steam jet positioned below said second mixing device, said steam jets and said mixing device being bodily removable from said mixing tube.

4. A cheese treating machine comprising a vertical mixing tube, a cheese comminuting device adapted to discharge into the upper end of said tube, a mixing unit having stationary and movable portions removably carried within said tube and adapted to be bodily slid transversely therefrom, a second mixing device having movable portions and having a screen, said second mixing device being adapted to be bodily removed laterally from said tube, a steam jet mounted below each of said mixing devices and adapted to be bodily removed laterally from said tube, and means for driving said comminuting device and said mixing device.

5. A cheese treating machine comprising a vertical mixing tube, a cheese comminuting device adapted to discharge into the upper end of said tube, a mixing unit having stationary and movable portions removably carried within said tube and adapted to be bodily slid transversely therefrom, a second mixing device having movable portions and having a screen, said second mixing device being adapted to be bodily removed laterally from said tube, a steam jet mounted below each of said mixing devices and adapted to be bodily removed laterally from said tube, a motor carried from said mixing tube and connected operatively to each of said mixing devices and to said comminuting device, said connection permitting the removal of said devices.

In testimony that I claim the foregoing I have hereunto set my hand at Knapp, in the county of Dunn and State of Wisconsin.

CARL F. P. SPIELMAN.